(12) United States Patent
Chowdhury et al.

(10) Patent No.: US 9,218,030 B2
(45) Date of Patent: Dec. 22, 2015

(54) PROGRAMMING INTERFACE AND METHOD

(71) Applicants:Arjun Pal Chowdhury, Kolkata (IN);
Neha Agarwal, Delhi (IN); Chandan Gupta, New Delhi (IN); Ankush Sethi, Karnal (IN)

(72) Inventors: Arjun Pal Chowdhury, Kolkata (IN);
Neha Agarwal, Delhi (IN); Chandan Gupta, New Delhi (IN); Ankush Sethi, Karnal (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 29 days.

(21) Appl. No.: 14/457,097

(22) Filed: Aug. 11, 2014

(65) Prior Publication Data
US 2014/0351570 A1    Nov. 27, 2014

Related U.S. Application Data

(63) Continuation-in-part of application No. 13/403,969, filed on Feb. 23, 2012, now abandoned.

(51) Int. Cl.
| | | |
|---|---|---|
| G06F 1/04 | (2006.01) | |
| G06F 1/24 | (2006.01) | |
| G06F 9/30 | (2006.01) | |
| G06F 9/38 | (2006.01) | |

(52) U.S. Cl.
CPC .............. *G06F 1/24* (2013.01); *G06F 9/30141* (2013.01); *G06F 9/3869* (2013.01)

(58) Field of Classification Search
CPC ..................................... G06F 1/24; G06F 1/04
See application file for complete search history.

(56) References Cited

U.S. PATENT DOCUMENTS

| | | | |
|---|---|---|---|
| 5,513,358 A | 4/1996 | Lundberg | |
| 6,711,701 B1 | 3/2004 | Roohparvar et al. | |
| 7,057,427 B2 | 6/2006 | Wadhwa | |
| 7,375,571 B1* | 5/2008 | Tiffany | G06F 1/04 327/298 |
| 7,840,837 B2 | 11/2010 | Totolos et al. | |
| 7,907,461 B1 | 3/2011 | Nguyen | |
| 8,018,256 B2 | 9/2011 | Zolfaghari | |
| 2003/0007409 A1* | 1/2003 | Ishikuri | G11C 5/147 365/226 |
| 2004/0199739 A1 | 10/2004 | Jeddeloh | |
| 2005/0190627 A1* | 9/2005 | Nakatake | H03L 7/08 365/226 |
| 2006/0214009 A1* | 9/2006 | Shikata | G06F 13/385 235/492 |
| 2008/0062782 A1* | 3/2008 | Namekawa | G11C 17/18 365/195 |
| 2009/0167398 A1* | 7/2009 | Oishi | H05B 33/0815 327/261 |
| 2009/0267659 A1* | 10/2009 | Li | H03K 17/22 327/143 |

* cited by examiner

*Primary Examiner* — Charles Rones
*Assistant Examiner* — Tian-Pong Chang
(74) *Attorney, Agent, or Firm* — Charles Bergere

(57) ABSTRACT

A programming interface and method of operating a programming interface use a system clock input, an asynchronous reset input, and an interface control input. The method selectively controls multiplexed coupling of a source register to a destination register and the destination register to a buffer register. The multiplexed coupling of the destination register to the buffer register reduces the possibility of the buffer register being corrupted when an asynchronous reset signal is applied to the programming interface. Problems associated with meta-stable asynchronous crossing paths in asynchronous reset programming systems are therefore alleviated.

20 Claims, 8 Drawing Sheets

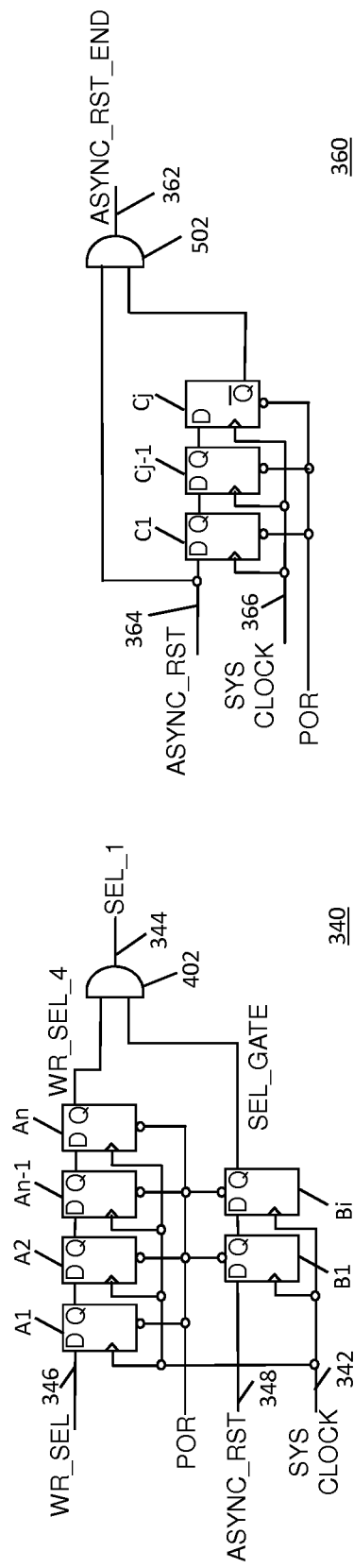

PROGRAMMING INTERFACE AND METHOD

CROSS-REFERENCE TO RELATED APPLICATIONS

This application is a continuation-in-part of U.S. application Ser. No. 13/403,969 filed on Mar. 22, 2012 entitled Data Processor with Asynchronous Reset.

BACKGROUND OF THE INVENTION

The present invention relates generally to programming systems with registers that in operation have synchronized clock input signal lines and one or more asynchronous reset input signal lines.

Programming systems that include an interface controller coupled to a programming interface have registers with reset and clock inputs. If the clock inputs are asynchronous then there is the possibility of circuit meta-stability. This meta-stability is due to asynchronous clock domain crossing (CDC), which can cause corrupt data to be stored in one or more of the registers. It is therefore generally desirable to provide for synchronous clock inputs to the registers so that asynchronous clock domain crossing is eliminated.

In programming systems the reset inputs of registers may provide for a synchronous or an asynchronous reset configuration. When considering synchronous reset configurations it is difficult to ensure proper timing of reset operations throughout the system. In contrast, asynchronous reset configurations are such that there is no synchronization with a system clock and thus asynchronous reset assertion may cause an immediate change in the state of a register. However, if a system has a source register supplying data to a destination register, and reset inputs of the registers are asynchronous with respect to each other, a meta-stable asynchronous crossing path can result. As a consequence, corrupt data may be stored in the destination register.

Therefore, it is an object of the present invention to alleviate at least one of the problems associated with meta-stable asynchronous crossing paths in asynchronous reset programming systems.

BRIEF DESCRIPTION OF THE DRAWINGS

The invention, together with objects and advantages thereof, may best be understood by reference to the following description of preferred embodiments together with the accompanying drawings in which:

FIG. 4 is a schematic circuit diagram of a pulse delay module that is part of the programming interface of FIG. 3, according to an embodiment of the present invention;

FIG. 5 is a schematic circuit diagram of an end of reset pulse generator that is part of the programming interface of FIG. 3, according to an embodiment of the present invention;

DETAILED DESCRIPTION OF PREFERRED EMBODIMENTS

Figure 1:
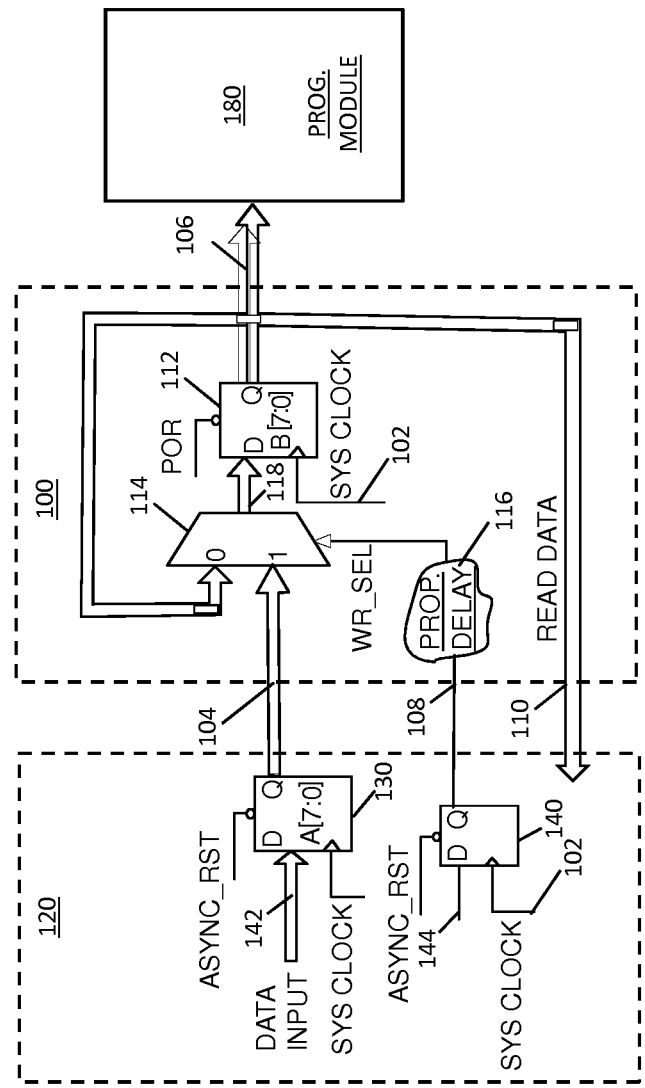
FIG. 1 is a schematic circuit diagram of a conventional programming interface when in use.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a programming interface comprising a system clock input, an interface data bus input, an interface data bus output, an asynchronous reset input and an interface control input. A destination register with a destination register clock input is coupled to the system clock input, a destination register data input and a destination register data output. A buffer register with a buffer register clock input is coupled to the system clock input, and a buffer register data input and a buffer register data output are coupled to the interface data bus output. A buffer multiplexer is provided with a buffer multiplexer control input, a buffer multiplexer output coupled to the buffer register data input, a buffer multiplexer first input coupled to the buffer register data output and a buffer multiplexer second input coupled to the destination register data output. The buffer multiplexer couples the buffer multiplexer second input to the buffer multiplexer output when a write signal pulse is applied to the buffer multiplexer control input, otherwise the buffer multiplexer couples the buffer multiplexer first input to the buffer multiplexer output. A tertiary multiplexer with a tertiary multiplexer control input has a tertiary multiplexer output, a tertiary multiplexer first input coupled to the destination register data output and a tertiary multiplexer second input coupled to the buffer register data output.

A destination multiplexer with a destination multiplexer control input is coupled to the interface control input, a destination multiplexer output is coupled to the destination register data input, a destination multiplexer first input is coupled to the tertiary multiplexer output and a destination multiplexer second input is coupled to the interface data bus input. A pulse delay module has a pulse delay module clock input coupled to the system clock input, a pulse delay module output coupled to the buffer multiplexer control input and a pulse delay module data input coupled to the interface control input. In operation when an asynchronous register reset signal is applied to the asynchronous reset input the write signal pulse supplied at the interface control input is blocked from being provided at the pulse delay module output.

In another embodiment, the present invention provides a method of controlling a programming interface that includes a system clock input coupled to a destination register and a buffer register with an output coupled to a programmable module. The interface is coupled to a controller that includes a source register coupled to the common clock. The method includes selecting a multiplexed coupling of an input of the destination register to an output of the destination register, and selecting a multiplexed coupling of an input of the buffer register to the output of the buffer register. A write signal is detected to transfer data from the source register to the destination register. The multiplexed coupling of the input of the destination register is modified to couple an output of the source register to the input of the destination register. Further detecting determines whether an asynchronous register reset signal has reset the contents of the source register. The method then performs a process of modifying the multiplexed coupling of the input of the buffer register to couple an output of the destination register to the input of the buffer register. The coupling of the input of the destination register to the output of the buffer register is allowed to occur only after the asynchronous reset signal is released and thereafter at least one clock cycle of a clock signal is applied to the system clock input.

Referring now to FIG. 1, a schematic diagram of a conventional programming interface 100, when in use, is shown. The programming interface 100 includes a system clock input 102 (SYS_CLOCK), an interface data bus input 104, an interface data bus output 106, an interface control input 108 and a confirmation data bus output 110 (READ DATA). A destination register 112 with a destination register clock input is coupled to the system clock input 102, a destination register data input and a destination register data output B_Q[7:0]. The destination register data output B_Q[7:0] is coupled to both the interface data bus output 106 and the confirmation data bus output 110, and a reset input of the destination register 112 is coupled to a Power On Reset line (POR).

There is a destination multiplexer 114 with a destination multiplexer control input (WR_SEL) coupled to the interface control input 108 through a propagation delay circuit 116 formed from combinational logic. The destination multiplexer 114 also has a destination multiplexer output 118 coupled to the destination register data input, a destination multiplexer first input 0 coupled to the destination register data output B_Q[7:0] and a destination multiplexer second input 1 coupled to the interface data bus input 104.

Coupled to the programming interface 100 is a interface controller 120 that includes a source register 130 and a write selection register 140. The interface controller 120 and source register 130 both have their respective clock inputs coupled to the system clock input 102 and their respective reset inputs coupled to a common asynchronous reset input (ASYNCH_RST). The source register 130 has a data input A_D[7:0] coupled to a controller data input bus 142 and an output A_Q[7:0] coupled to the interface data bus input 104. The write selection register 140 has a data input coupled to a control line 144 and an output coupled to the interface control input 108.

As shown, the confirmation data bus output 110 is coupled to the interface controller 120 and the interface data bus output 106 is coupled to a programmable module 180.

Figure 2:
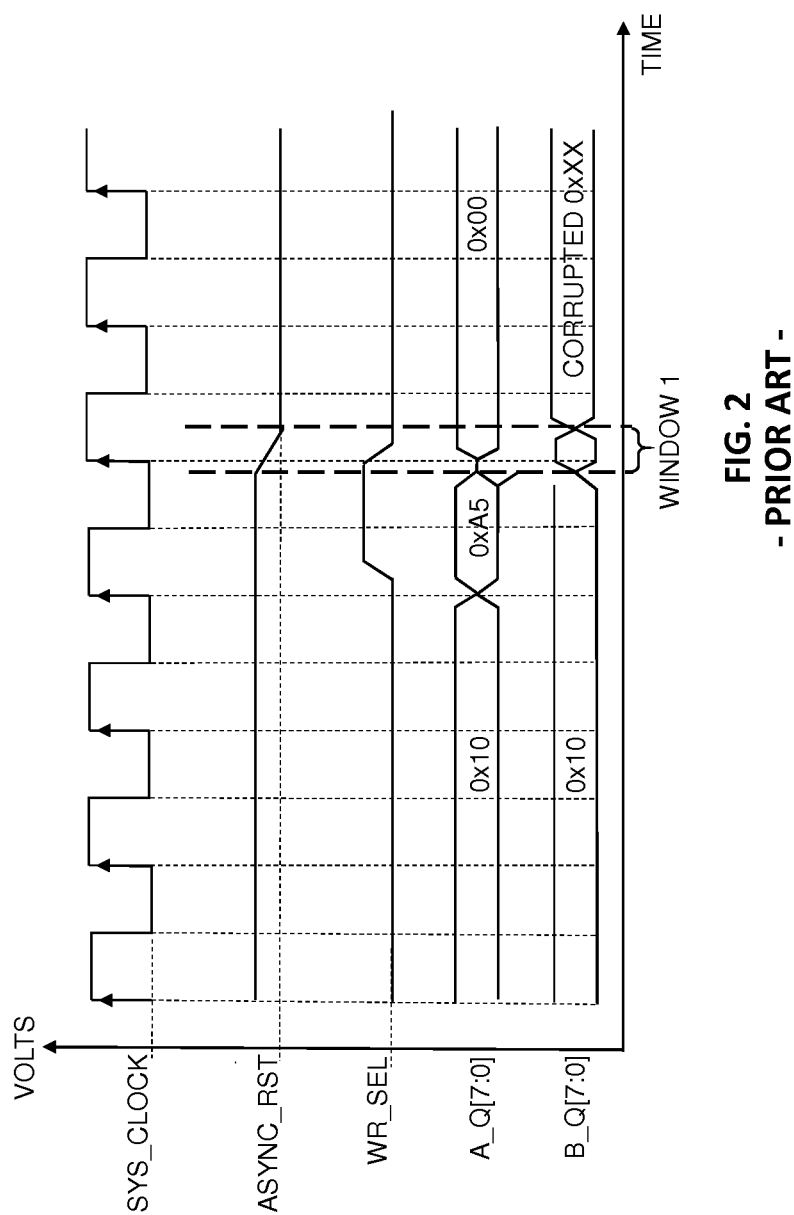
FIG. 2 is a timing diagram of signals appearing in one situation during operation of the conventional programming interface of FIG. 1.

Referring to FIG. 2, a timing chart of signals appearing in one possible situation during operation of the programming interface 100 is shown. In this illustration all clock inputs are rising edge triggered and as shown the common asynchronous reset node (ASYNCH_RST) is initially high (inactive), the interface control input 108 is low resulting in the multiplexer control input (WR_SEL) to also be low. The output A_Q[7:0] of the source register 130 supplies a hexadecimal value of 10 to the destination multiplexer second input 1. Also, the output B_Q[7:0] of the destination register 112 supplies a hexadecimal value of 10 to both the destination multiplexer first input 0 and the interface data bus output 106. In this condition, since the multiplexer control input (WR_SEL) is low, the destination multiplexer first input 0 is coupled to the destination multiplexer output 118. Consequently, the output B_Q[7:0] of the destination register 112 is fed back to the input B_D[7:0] of the destination register 112.

When an updated data value is to be loaded into the destination register 112, for instance hexadecimal value of A5, this value is loaded into the source register 130 when a logic value 1 is concurrently loaded into the write selection register 140. This loading is caused when a rising clock transition occurs on the system clock input 102 (SYS_CLOCK) and results in the interface control input 108 transitioning to a logic value 1. A short time later, this logic value propagates through the propagation logic circuit 116 and results in the multiplexer control input (WR_SEL) transitioning from a low to a high state. Consequently, the data input B_D[7:0] of the destination register 112 is coupled to the interface data bus input 104. Under normal operation, the hexadecimal value of A5 will therefore be loaded from the source register 130 to the destination register 112 on the next rising transition of clock input 102 (SYS_CLOCK). However, if the next rising transition of clock input 102 (SYS_CLOCK) occurs during an asynchronous reset transition of the source register 130, as illustrated by window 1, it is highly likely that the data loaded into the destination register 112 will be corrupted.

Figure 3:
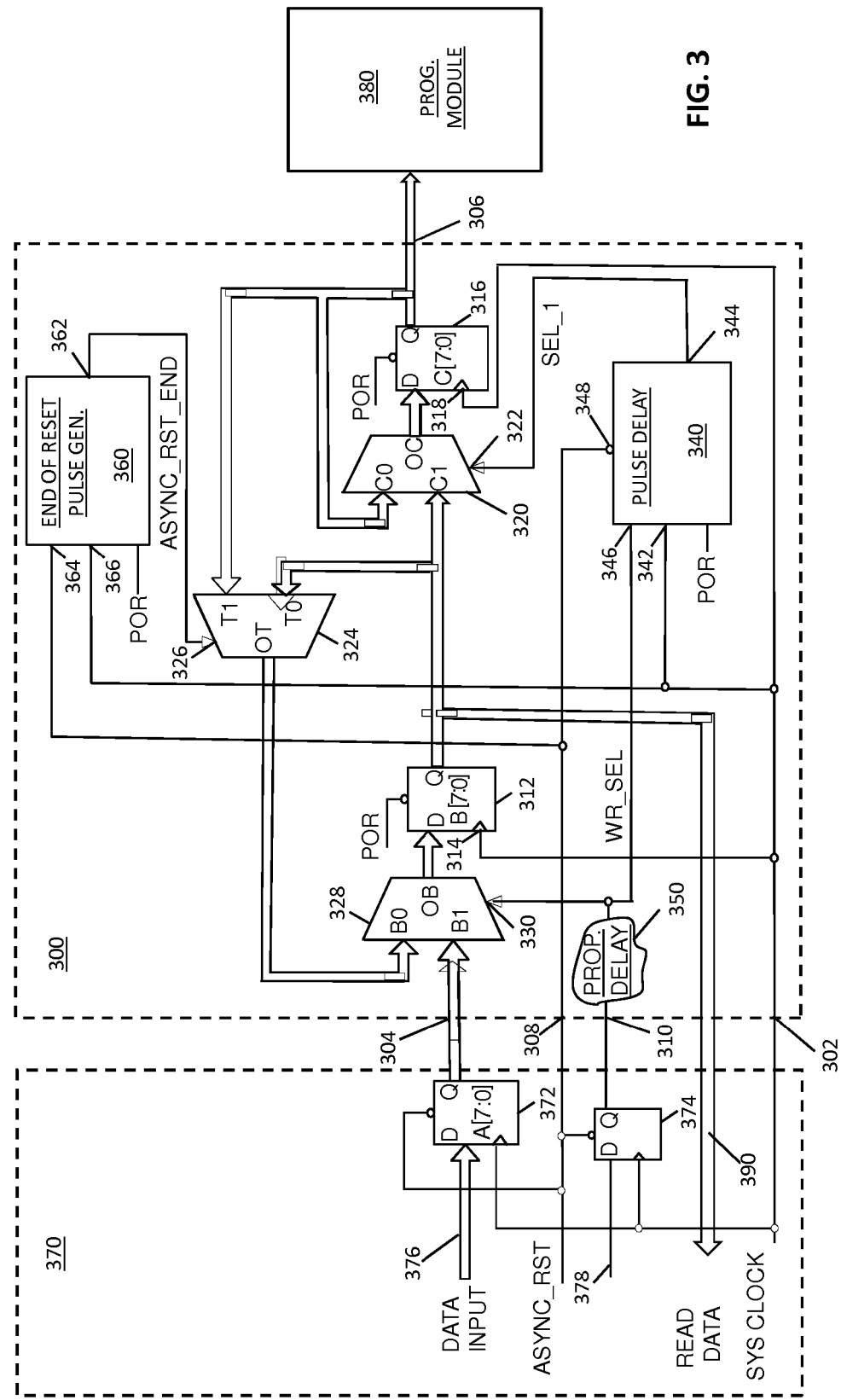
FIG. 3 is a schematic circuit diagram of a programming interface when in use, according to an embodiment of the present invention.

FIG. 3 is a schematic circuit diagram of a programming interface 300, when in use, according to an embodiment of the present invention. The programming interface 300 includes a system clock input 302 (SYS_CLOCK), an interface data bus input 304, an interface data bus output 306, an asynchronous reset input 308 (ASYNC_RST) and an interface control input 310. There is a destination register 312 with a destination register clock input 314 coupled to the system clock input 302, a destination register data input B_D[7:0] and a destination register data output B_Q[7:0]. The destination register 312 also has a reset input coupled to a power on reset system input POR.

The programming interface 300 also includes a buffer register 316 with a buffer register clock input 318 coupled to the system clock input 302, a buffer register data input C_D[7:0] and a buffer register data output C_Q[7:0] coupled to the interface data bus output 306. The buffer register 316 also has a reset input coupled to the power on reset system input POR.

There is a buffer multiplexer 320 with a buffer multiplexer control input 322 and a buffer multiplexer output OC coupled to the buffer register data input C_D[7:0]. The buffer multiplexer 320 also has a buffer multiplexer first input C0 coupled to the buffer register data output C_Q[7:0] and a buffer multiplexer second input C1 coupled to the destination register data output B_Q[7:0]. In operation the buffer multiplexer 320 couples the buffer multiplexer second input C1 to the buffer multiplexer output OC when a write signal pulse (WSP) is applied to the buffer multiplexer control input 322. Otherwise, the buffer multiplexer 320 couples the buffer multiplexer first input C0 to the buffer multiplexer output OC.

There is a tertiary multiplexer 324 with a tertiary multiplexer control input 326 and a tertiary multiplexer output OT.

The tertiary multiplexer 324 also includes a tertiary multiplexer first input T0 coupled to the destination register data output B_Q[7:0] and a tertiary multiplexer second input T1 coupled to the buffer register data output C_Q[7:0].

The programming interface 300 further includes a destination multiplexer 328 with a destination multiplexer control input 330 coupled to the interface control input 310. The destination multiplexer 328 has a destination multiplexer output OB coupled to the destination register data input B_D[7:0], a destination multiplexer first input B0 coupled to the tertiary multiplexer output OT and a destination multiplexer second input B1 coupled to the interface data bus input 304.

There is a pulse delay module 340 with a pulse delay module clock input 342 coupled to the system clock input 302, and a pulse delay module output 344 (SEL_1) coupled to the buffer multiplexer control input 322. The pulse delay module 340 has a pulse delay module data input 346 coupled to the interface control input 310 and an enable input 348 coupled to the asynchronous reset input 308. The pulse delay module 340 also has a reset input coupled to the power on reset system input POR.

There is also a propagation delay circuit 350, typically combinational logic, coupling the interface control input 310 to both the destination multiplexer control input 330 and the pulse delay module data input 346. Furthermore, an end of reset pulse generator 360 with an output 362 (ASYNC_RST_END) is coupled to the tertiary multiplexer control input 326. The end of reset pulse generator 360 includes a register data input 364 coupled to the asynchronous reset input 308 and a clock input 366 coupled to the system clock input 302. The end of reset pulse generator 360 also has a reset input coupled to the power on reset system input POR.

When in use the programming interface 300 is coupled to an interface controller 370 comprising a source register 372 and a write selection register 374. The registers 372, 374 have their respective clock inputs coupled to the system clock input 302 and their respective reset inputs coupled to a common asynchronous reset input 308. The source register 372 has a data input A_D[7:0] coupled to a controller data input bus 376 and an output A_Q[7:0] coupled to the interface data bus input 304. The write selection register 372 has a data input coupled to a control line 378 and an output Q coupled to the interface control input 310.

As shown, the interface data bus output 306 is coupled to an input of a programmable module 380 and the destination register data output B_Q[7:0] is coupled to a confirmation data bus 390 (READ DATA) of the interface controller 370.

Referring to FIG. 4, a schematic circuit diagram of the pulse delay module 340, according to an embodiment of the present invention. The pulse delay module 340 includes a delay chain of registers A1 to An where in this embodiment there are four such registers (n=4). The first register A1 has an input D that is the pulse delay module data input 346 and the last register An has an output Q (WR_SEL_4) coupled to a first input of an AND gate 402. There is a clocked reset group of shift registers B1 to Bi where in this embodiment there are two such registers (i=2) and the relationship between n and i in the delay chain block is n>=3, i>=2 and n>i. The first register B1 has an input D that is the enable input 348 and the last register Bi has an output Q (SEL_GATE) coupled to a second input of the AND gate 402. Clock inputs and reset inputs of all the registers A1 to An and B1 to Bi are coupled respectively to the pulse delay module clock input 342 and POR input. Also the pulse delay module output 344 is provided by an output of the AND gate 402.

FIG. 5 is a schematic circuit diagram of the end of reset pulse generator 360, according to an embodiment of the present invention. The end of reset pulse generator 360 includes a delay chain of registers C1 to Cj where in this embodiment there are three such registers (j=3). The first register C1 has an input D that is the register data input 364 and the last register Cn has an output Qbar coupled to a first input of an AND gate 502. A second input of the AND gate 502 is coupled to the register data input 364 and an output of the AND gate 502 is the output 362 of the end of reset pulse generator 360.

Figure 6:
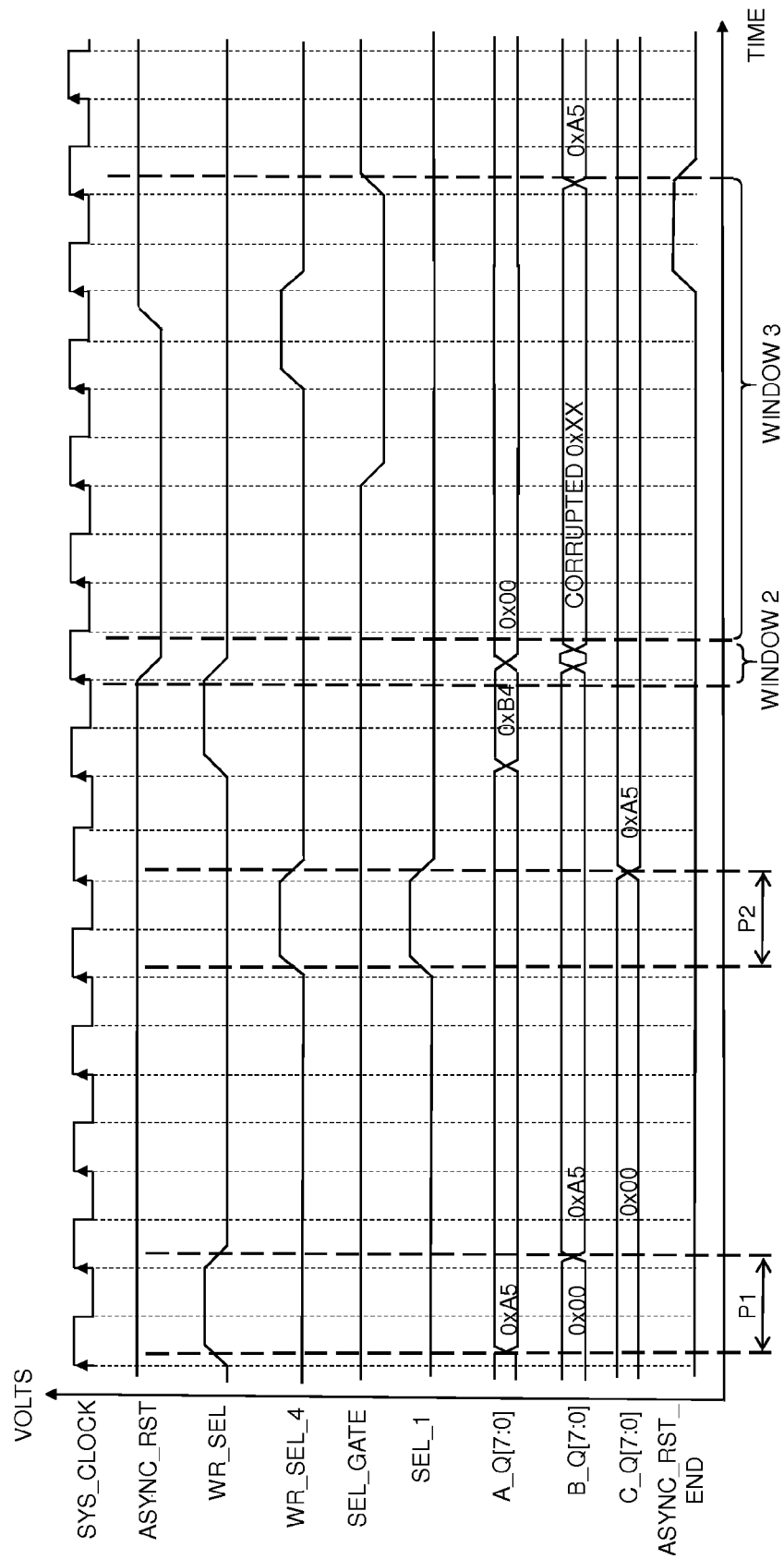
FIG. 6 is a timing diagram of signals appearing in one situation during operation of the programming interface of FIG. 3.

FIG. 6 is a schematic timing diagram of signals appearing in one situation during operation of the programming interface 300. In this illustration all clock inputs are rising edge triggered and as shown the common asynchronous reset input 308 (ASYNCH_RST) is initially high (inactive). Before the first rising edge of the clock pulse (SYS_CLOCK), the interface control input 310 is low resulting in the destination multiplexer control input 330 (WR_SEL) to also be low. Furthermore, the output A_Q[7:0] of the source register 372 has previously been supplied a hexadecimal value of 00. This value has been clocked into both the destination register 312 and buffer register 316 resulting in the outputs B_Q[7:0] and C_Q[7:0] having the hexadecimal value of 00. Since the destination multiplexer control input 330 (WR_SEL) and tertiary multiplexer control input 326 (ASYNCH_RST_END) are low, the output B_Q[7:0] is fed back to the input B_D[7:0] of the destination register 312. Similarly, since the buffer multiplexer control input 322 (SEL_1) is low, the output C_Q[7:0] of the buffer register 316 is fed back to the input C_D[7:0] of the buffer register 316.

When an updated data value is to be loaded into the destination register 112, for instance hexadecimal value of A5, this value is loaded into the source register 372 when a logic value 1 is concurrently loaded into the write selection register 374. This loading is caused when a rising clock transition occurs on the system clock input 302 (SYS_CLOCK) and results in the interface control input 310 transitioning to a logic value 1. A short time later, this logic value propagates through the propagation delay circuit 350 resulting in the destination multiplexer control input 330 (WR_SEL) transitioning from a low to a high state. The destination multiplexer control input 330 (WR_SEL) typically remains in the high state for a single clock cycle to thereby provide a pulse. Consequently, the data input B_D[7:0] of the destination register 312 is temporarily coupled to the interface data bus input 304 during a period P1. The hexadecimal value of A5 will therefore be loaded from the source register 372 to the destination register 312 on the next rising transition of clock input 302 (SYS_CLOCK).

When the delay chain of registers A1 to An has four registers (n=4), a pulse typically of one clock cycle at the pulse delay module output 344 (SEL_1) will normally occur on a fourth rising edge after the multiplexer control input 330 (WR_SEL) transitions from a low to a high state. As a result, the data input C_D[7:0] of the buffer register 316 is temporarily coupled, for one clock cycle, to the data output B_Q[7:0] of the destination register 312 as indicated by a period P2. The hexadecimal value of A5 will be loaded from the destination register 372 to the buffer register 316 on the next rising transition of clock input 302 (SYS_CLOCK).

As illustrated, during a period identified in window 2, a rising transition of clock input 102 (SYS_CLOCK) occurs during a register reset signal in the form of an asynchronous reset (ASYNCH_RST) being applied to the source register 372. During the period of widow 2 it is highly likely that the data loaded into the destination register 312 will be corrupted. However, the last register Bi output Q (SEL_GATE) follows the value of asynchronous reset (ASYNCH_RST) by two clock pulses. Accordingly, the last register Bi output Q (SEL_

GATE) and the last register An output Q (WR_SEL_4) are not both concurrently at a logic 1 when the destination register 312 is potentially corrupted during a window 3 and thus the buffer register 316 cannot be corrupted.

In this illustration the delay chain of registers C1 to Cj comprises a single register (j=2) and thus the output 362 of the end of reset pulse generator 360 provides an end of reset pulse (ASYNCH_RST_END pulse), for a duration of two clock cycle, on a first rising clock edge after the asynchronous reset (ASYNCH_RST transitions from a low to a high state. However, the number registers C1 to Cj can vary as can the duration of the end of reset pulse (ASYNCH_RST_END pulse.

During this ASYNCH_RST_END pulse the contents (hexadecimal A5) of the buffer register 316 are loaded into the destination register 312 on a rising clock edge. Thus, as illustrated, in operation when the register reset signal (ASYNCH_RST) is applied to the asynchronous reset input 308 the write signal pulse supplied at the interface control input 310 is blocked from being provided at the pulse delay module output 344. If an asynchronous reset 308 asserts after ((n-i)+1) active clock edges of a WR_SEL assertion at input 346, the write signal pulse provided at the pulse delay module output 344 will be asserted and a safe write to buffer 316 will occur and load the current data from Buffer 312. However, if the asynchronous reset 348 asserts before ((n-i)+1) active clock edges of the WR_SEL assertion at input 346, the write signal pulse at output 344 will be gated by 402 and no pulse will be visible at the pulse delay module output 344. Hence, no write will occur to the buffer register 316 and it will therefore retain its uncorrupted (safe) value.

Figure 7:
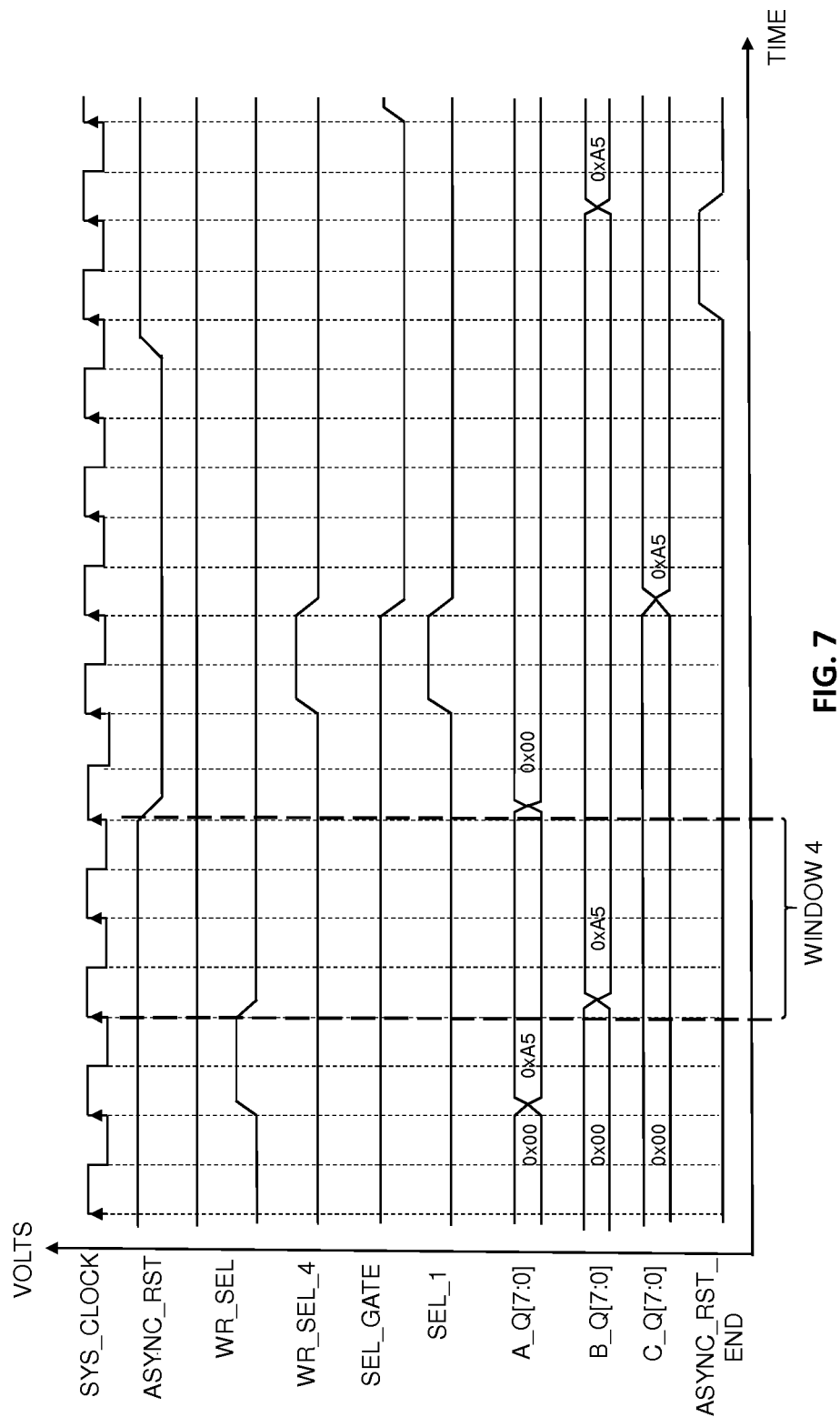
FIG. 7 is a timing diagram of signals appearing in another situation during operation of the programming interface of FIG. 3.

Referring to FIG. 7, a schematic timing diagram of signals appearing in another situation during operation of the programming interface 300 is shown. In this illustration all clock inputs are rising edge triggered and as shown the common asynchronous reset input 308 (ASYNCH_RST) is initially high (inactive). As shown, the asynchronous reset of asynchronous reset input 308 (ASYNCH_RST) occurs (commences) within the next three SYS_CLOCK rising edges (window 4) after the after the multiplexer control input 330 (WR_SEL) transitions from a low to a high state. Although there is no potential for the destination register 312 to be corrupted, the contents (hexadecimal A5) of the buffer register 316 are loaded into the destination register 312 during the ASYNCH_RST_END pulse.

Figure 8:
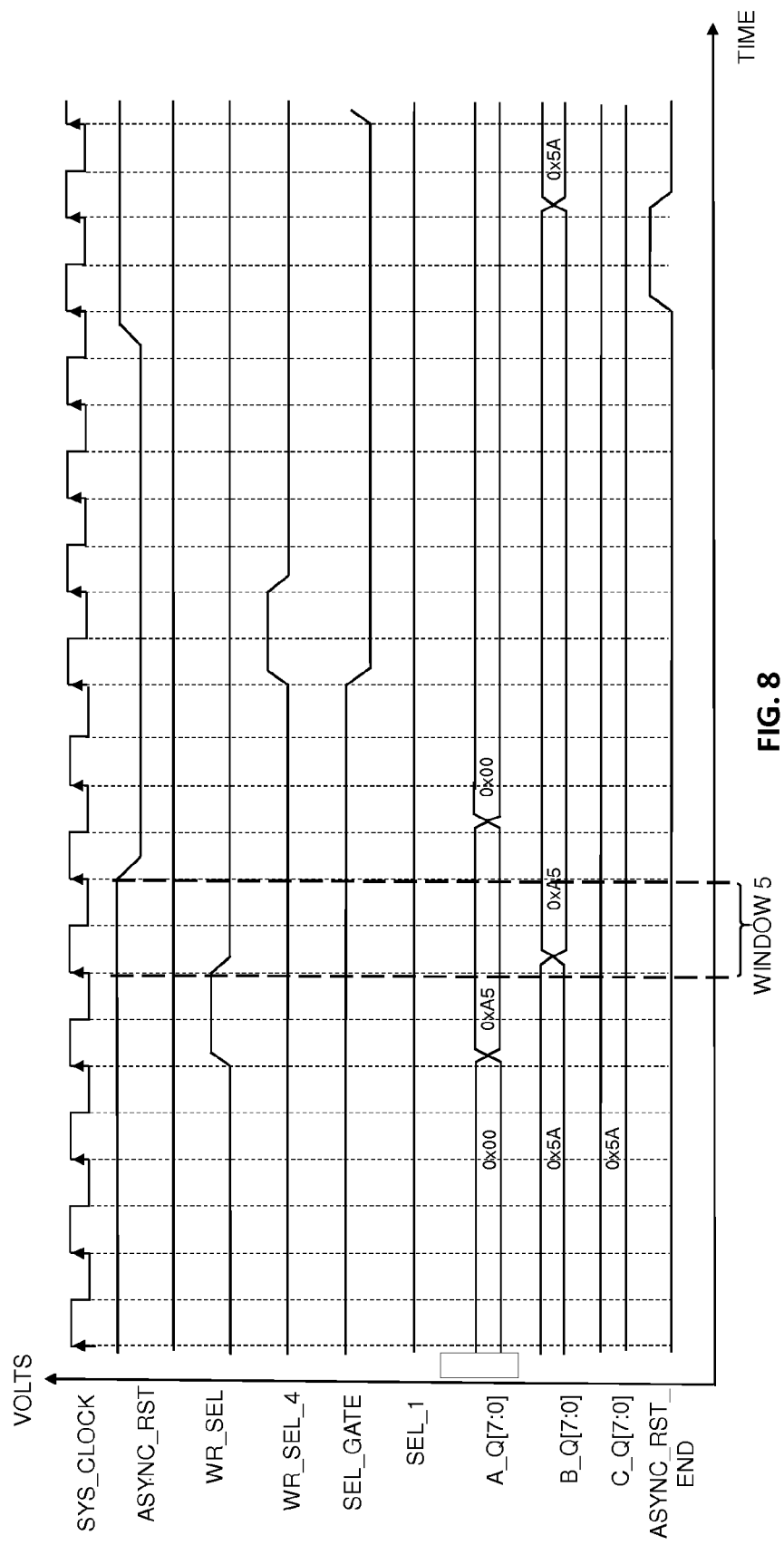
FIG. 8 is a timing diagram of signals appearing in a further situation during operation of the programming interface of FIG. 3.

FIG. 8 is a timing diagram of signals appearing in a further situation during operation of the programming interface 300. Again, in this illustration all clock inputs are rising edge triggered and as shown the common asynchronous reset input 308 (ASYNCH_RST) is initially high (inactive). As shown, the asynchronous reset of asynchronous reset input 308 (ASYNCH_RST) occurs (commences) within the next two SYS_CLOCK rising edges (window 5) after the after the multiplexer control input 330 (WR_SEL) transitions from a low to a high state. Consequently, this transition of WR_SEL takes 4 clock cycles to reach the first input of an AND gate 402 (WR_SEL_4), whereas the asynchronous reset signal only takes 2 clock cycles to reach the second input of the AND gate 402 (SEL_GATE) which will prevent loading the updated data 5A to buffer register 316. Although there is no potential for the destination register 312 to be corrupted, the contents (hexadecimal 5A) of the buffer register 316 are loaded into the destination register 312 during the ASYNCH_RST_END pulse.

From the above it is apparent that in operation if an asynchronous reset 308 asserts after (n-i)+1 active clock edges of a WR_SEL assertion, the write signal pulse provided at the pulse delay module output 344 will be asserted and safe write will be provided to the buffer register 316. If the asynchronous reset 348 asserts before (n-i)+1 active clock edges of the WR_SEL assertion, the write signal pulse at 344 will be gated by 402 and no pulse will be provided at pulse delay module output 344. Since the number of registers in the pulse delay module 340 can be varied, if n=4 and i=2 an asynchronous rest pulse occurrence after three active system clock edges will not gate the pulse delay module output 344. Also from the above embodiments, and timing chart, it will be apparent that after release of a register reset signal RESET applied to the asynchronous reset input 308, the write or read command to destination register 312 should be provided only after at least "j" clock cycles is applied to the system clock input 302.

Figure 9:
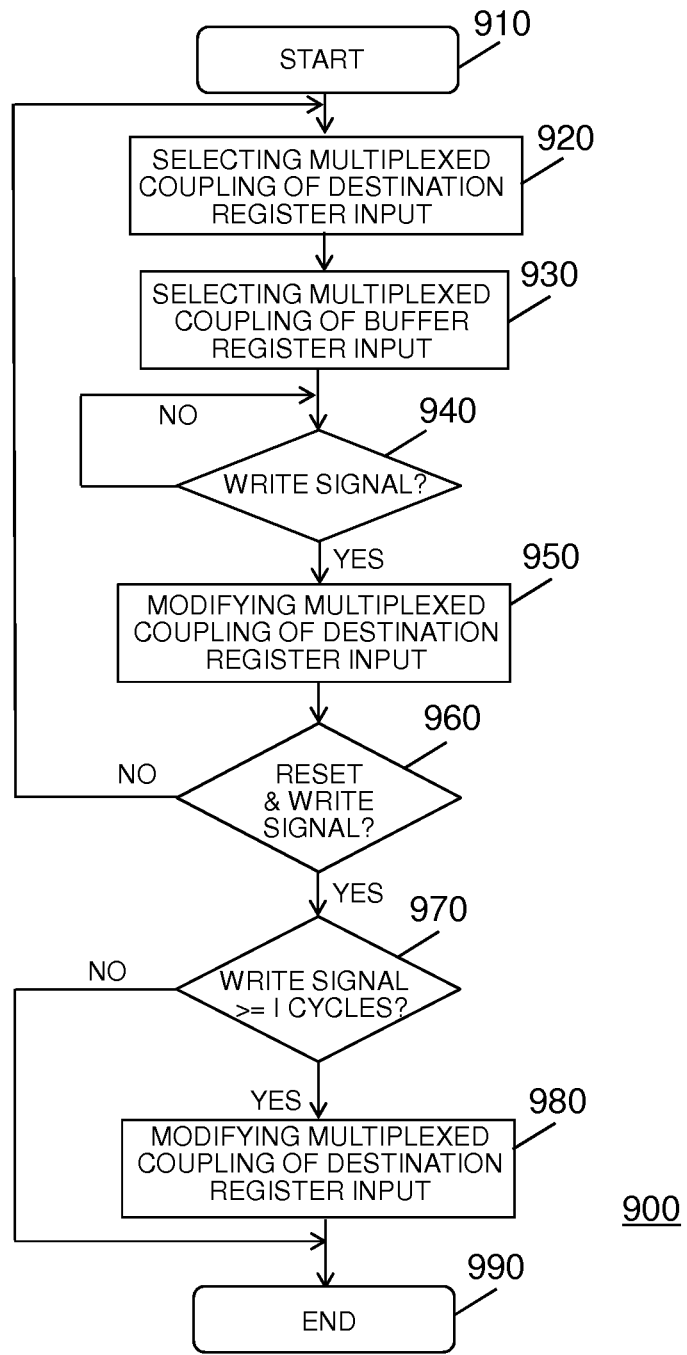
FIG. 9 is a flow chart illustrating a method of controlling the programming interface according to an embodiment of the present invention.

Referring to FIG. 9, a flow chart of a method 900 of controlling the programming interface 300 when coupled to the interface controller 370 according to an embodiment of the present invention is shown. After an initializing start block 910 the method 900 at a block 920 includes a process of selecting a multiplexed coupling of the input B_D[7:0] of the destination register 312 to the output of the destination register B_Q[7:0]. This multiplexing is provided by suitable controlling of the tertiary multiplexer 324 and destination multiplexer 328. The method 900 at a block 930 performs selecting a multiplexed coupling of the input C_D[7:0] of the buffer register 316 to the output C_Q[7:0] of the buffer register 316. This multiplexing is provided by suitable controlling of the buffer multiplexer 320.

At a block 940 it is determined if a write signal (WR_SEL) to transfer data from the source register 372 to the destination register 312 has been detected. Once detected a block 950 modifies the multiplexed coupling of an input B_D[7:0] of the destination register 312 to couple the output A_Q[7:0] of the source register 372 to the input B_D[7:0] of the destination register 312. This modifying is provided by suitable controlling of the tertiary multiplexer 324 and destination multiplexer 328.

At a detecting block 960, it is determined whether an asynchronous register reset (ASYNCH_SST) signal applied to the asynchronous reset input 308 has reset the contents of the source register 372 whilst the write signal (WR_SEL) is still applied to the interface control input 310. If there is no asynchronous register reset (ASYNCH_SST) signal detected the method 900 returns to block 920 where the input B_D[7:0] of the destination register 312 is again coupled to the output of the destination register B_Q[7:0].

If the asynchronous register reset (ASYNCH_SST) signal is detected at block 960, then a block 970 determines if there are at least a further i clock cycles whilst the write signal (WR_SEL) is maintained. Typically i is an integer between 1 and 4, and the illustrated embodiment the for the pulse delay module 340, i is set to 2.

If the write signal (WR_SEL) is maintained for the further i clock cycles, the method 900 proceeds to block 980, otherwise the method 900 terminates at an end block 990. At block 980 the method 900 modifies the multiplexed coupling of the input C_D[7:0] of the buffer register 316 to couple the output B_Q[7:0] of the destination register 312 to the input of the buffer register C_D[7:0]. This modifying is provided by suitable controlling of the buffer multiplexer 320. The method 900 then terminates at block 990.

It will be appreciated that the coupling of input B_D[7:0] of the destination register 312 to the output C_Q[7:0] of the buffer register 316 is allowed to occur only after the asynchronous reset signal is released and thereafter at least one clock cycle of a clock signal is applied to the system clock input 308. It will also be appreciated from the timing chart that the method 900 also includes detecting a termination of the asynchronous register reset signal and in response to the termination generating an end of reset pulse. In response to the end of reset pulse the input B_D[7:0] of the destination register 312 is coupled to the output C_Q[7:0] of a buffer register 316 typically for a single clock cycle of the clock. After the single clock cycle the output C_Q[7:0] of the buffer register 316 is coupled to the input C_D[7:0] of the buffer register 316.

Advantageously, the present invention at least alleviates one of the problems associated with metastable asynchronous crossing paths in asynchronous reset programming systems. This is achieved by disallowing the corruption of the buffer register 316 during an asynchronous system reset, the contents of the buffer register 316 can then be loaded into the potentially corrupted destination register 312 one or more clock cycles after the release of the asynchronous system reset. Consequently, a programmable memory in the programmable module 380 is less likely to be loaded with corrupt data as will be apparent to a person skilled in the art.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A programming interface, comprising:
a system clock input, an interface data bus input, an interface data bus output, an asynchronous reset input and an interface control input;
a destination register with a destination register clock input coupled to the system clock input, a destination register data input and a destination register data output;
a buffer register with a buffer register clock input coupled to the system clock input, a buffer register data input and a buffer register data output coupled to the interface data bus output;
a buffer multiplexer with a buffer multiplexer control input, a buffer multiplexer output coupled to the buffer register data input, a buffer multiplexer first input coupled to the buffer register data output and a buffer multiplexer second input coupled to the destination register data output, wherein the buffer multiplexer couples the buffer multiplexer second input to the buffer multiplexer output when a write signal pulse is applied to the buffer multiplexer control input, otherwise the buffer multiplexer couples the buffer multiplexer first input to the buffer multiplexer output;
a tertiary multiplexer with a tertiary multiplexer control input, a tertiary multiplexer output, a tertiary multiplexer first input coupled to the destination register data output and a tertiary multiplexer second input coupled to the buffer register data output;
a destination multiplexer with a destination multiplexer control input coupled to the interface control input, a destination multiplexer output coupled to the destination register data input, a destination multiplexer first input coupled to the tertiary multiplexer output and a destination multiplexer second input coupled to the interface data bus input; and
a pulse delay module with a pulse delay module clock input coupled to the system clock input, a pulse delay module output coupled to the buffer multiplexer control input and a pulse delay module data input coupled to the interface control input,
wherein in operation when an asynchronous register reset signal is applied to the asynchronous reset input the write signal pulse supplied at the interface control input is blocked from being provided at the pulse delay module output.

2. The programming interface of claim 1, wherein the pulse delay module is characterised such that after the register reset signal is released from asynchronous reset input, the write signal pulse is provided at the pulse delay module output only after at least three clock cycles of a clock signal is applied to the system clock input.

3. The programming interface of claim 2, wherein the pulse delay module is characterised such that after a register reset is released from the asynchronous reset input, the write signal pulse is provided at the pulse delay module output only after at four clock cycles of the clock signal applied to the system clock input.

4. The programming interface of claim 3, wherein the pulse delay module is characterised such that after a register reset is released from the asynchronous reset input, the write signal pulse is provided at the pulse delay module output only after at least four clock cycles of the clock signal applied to the system clock input.

5. The programming interface of claim 2, further including a propagation delay circuit coupling the interface control input to the destination multiplexer control input.

6. The programming interface of claim 5, wherein the propagation delay circuit couples the interface control input to the pulse delay module data input.

7. The programming interface of claim 2, wherein the pulse delay module includes a delay chain of registers.

8. The programming interface of claim 2, wherein in operation the tertiary multiplexer couples the tertiary multiplexer first input to the tertiary multiplexer output when an end of reset pulse is applied to the buffer multiplexer control input otherwise the tertiary multiplexer couples the tertiary multiplexer second input to the tertiary multiplexer output.

9. The programming interface of claim 2, further including an end of reset pulse generator coupled to the tertiary multiplexer control input, wherein in operation after the register reset signal is applied to the asynchronous reset input the end of reset pulse generator generates the end of reset pulse.

10. The programming interface of claim 9, wherein the end of reset pulse generator is characterised such that the end of reset pulse has a duration of at least one clock cycle of the clock signal.

11. The programming interface of claim 10, wherein the end of reset pulse generator includes a delay chain of registers with a first register having a register data input coupled to the asynchronous reset input and clock inputs of the delay chain of registers coupled to the system clock input.

12. The programming interface of claim 2, wherein in operation the destination multiplexer couples the destination multiplexer second input to the destination multiplexer output when the write signal pulse is applied to the destination multiplexer control input, otherwise the destination multiplexer couples the destination multiplexer first input to the destination multiplexer output.

13. The programming interface of claim 2, wherein the interface is coupled to a source register that includes a source register clock input coupled to the system clock input, a source register data output coupled to the interface data bus input and a source register reset input coupled to the asynchronous reset input.

14. The programming interface of claim 13, wherein the interface is coupled to an interface control register that includes a control register clock input coupled to the system clock input, a control register output coupled to the interface control input and a control register reset input coupled to the asynchronous reset input.

15. A method of controlling a programming interface that includes a system clock input coupled to a destination register and a buffer register with an output coupled to a programmable module, the interface being coupled to a controller that includes a source register coupled to the common clock, the method comprising:

selecting a multiplexed coupling of an input of the destination register to an output of the destination register;

selecting a multiplexed coupling of an input of the buffer register to the output of the buffer register;

detecting a write signal to transfer data from the source register to the destination register;

modifying the multiplexed coupling of the input of the destination register to couple an output of the source register to the input of the destination register;

detecting whether an asynchronous register reset signal has reset the contents of the source register;

modifying the multiplexed coupling of the input of the buffer register to couple an output of the destination register to the input of the buffer register, wherein the coupling of input of the destination register to the output of the buffer register is allowed to occur only after the asynchronous reset signal is released and thereafter at least one clock cycle of a clock signal is applied to the system clock input.

16. The method of claim 15, further comprising:

detecting a termination of the asynchronous register reset signal and in response to the termination generating an end of reset pulse.

17. The method of claim 16, wherein in response to the end of the reset pulse, the input of the destination register is coupled to the output of a buffer register.

18. The method of claim 17, wherein the destination register is coupled to the output of a buffer register for a single clock cycle of the clock.

19. The method of claim 18, wherein after the single clock cycle, the output of the buffer register is coupled to the input of the buffer register.

20. The method of claim 18, wherein in operation the end of reset pulse has a duration of at least one clock cycle of the clock signal.

* * * * *